(12) United States Patent
Weidinger

(10) Patent No.: US 6,213,648 B1
(45) Date of Patent: Apr. 10, 2001

(54) SHEET METAL CAGE FOR ROLLER BEARINGS AND METHOD FOR PRODUCING SHEET METAL CAGE

(75) Inventor: Alfred Weidinger, Oberwerrn (DE)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/252,977

(22) Filed: Feb. 19, 1999

(30) Foreign Application Priority Data

Feb. 20, 1998 (DE) .............................................. 198 07 160

(51) Int. Cl.⁷ ...................................................... F16C 33/54
(52) U.S. Cl. .............................................. 384/575; 384/572
(58) Field of Search ..................................... 384/571, 575, 384/580, 572, 578; 29/898.067

(56) References Cited

FOREIGN PATENT DOCUMENTS 908 436   4/1954 (DE) .

Primary Examiner—Charles A. Marmor
Assistant Examiner—Ankur Parekh
(74) Attorney, Agent, or Firm—Burns, Doane, Swecker & Mathis, L.L.P.

(57) ABSTRACT

A process for producing a sheet metal cage for roller bearings involves using a press roll to form a disk-shaped circular sheet metal blank into a tubular element having radially inwardly projecting and axially extending ribs, and stamping window-shaped pockets into the tubular element between adjoining ribs to produce a cage of a rolling bearing for receiving rolls in the window-shaped cutouts. The sheet metal cage produced by the method possesses a conically rolled outer surface and side rings arranged at opposite ends. The cage includes ridges extending between the side rings and window-shaped pockets between adjacent pairs of ridges for receiving tapered rolls. The cage also includes ribs extending inwardly from each of the ridges, with the ribs possessing tapering side surfaces.

6 Claims, 1 Drawing Sheet

SHEET METAL CAGE FOR ROLLER BEARINGS AND METHOD FOR PRODUCING SHEET METAL CAGE

Figure 1:
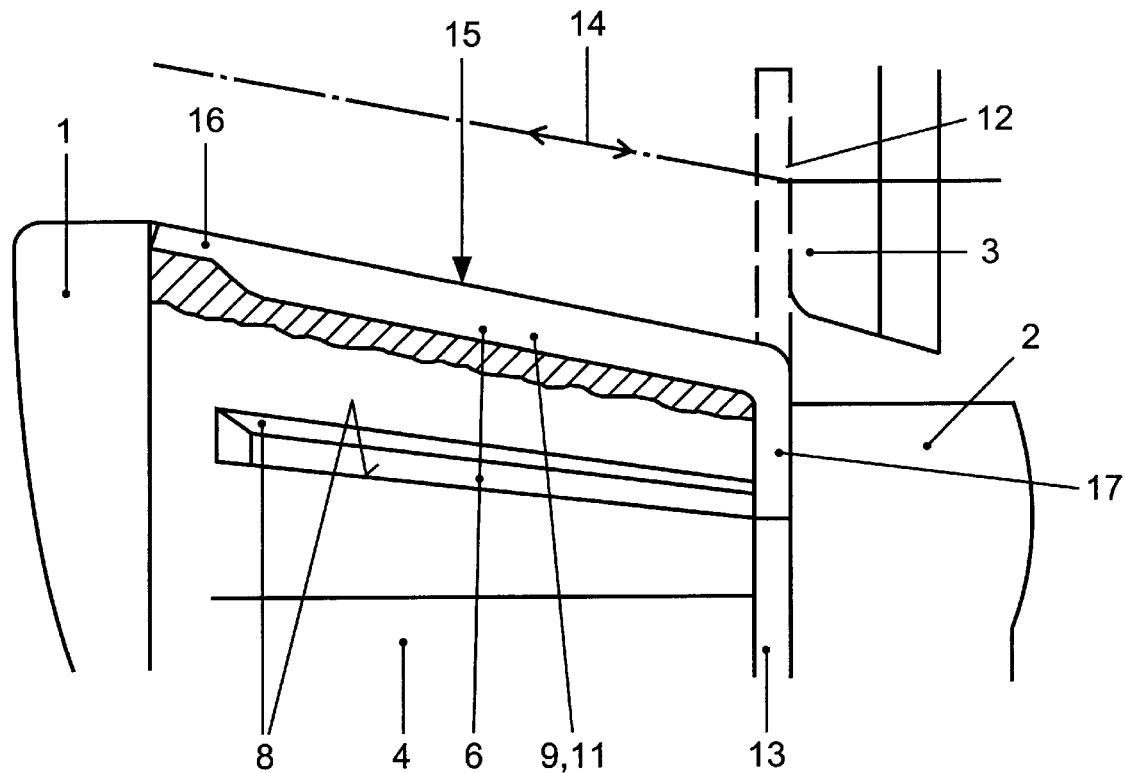

This application corresponds to and claims priority under 35 U.S.C. § 119 with respect to German Application No. P 198 07 160.4 filed on Feb. 20, 1998, the entire content of which is incorporated herein by reference.

FIELD OF THE INVENTION

This invention generally relates to roller bearings. More particularly, the present invention pertains to a sheet metal cage for roller bearings and a process for producing a sheet metal cage for roller bearings.

BACKGROUND OF THE INVENTION

DE 908 436 describes how sections forming a cage are cut from a pipe provided with axially extending ribs. According to this described method, an axially centered area corresponding to the length of the pockets is turned-out so that only the ribs remain in the finished cage. The axially adjoining sections on both sides of the pockets remain unchanged and form the side rings of the cage.

The pipe with the ribs that forms the starting material can only be produced with great difficulty in the required measuring quality. This is particularly true in the case of long pipes. Because of the ribs, the cutting process is not easy and results in high expenditure and high measuring tolerances.

In light of the foregoing, a need exists for a cage and a method of producing a cage that is not as susceptible to the same disadvantages and drawbacks as those described above.

It would thus be desirable to provide a cage for roller bearings and a method of producing such a cage that permits lower production costs and better quality.

SUMMARY OF THE INVENTION

According to one aspect of the invention, a process for producing a sheet metal cage used in roller bearings involves using a press roll to form a disk-shaped circular sheet metal blank into a tubular element having radially inwardly projecting and axially extending ribs through use of a press roll. Window-shaped pockets are then stamped into the tubular sheet metal element between adjoining ribs to produce a cage of a rolling bearing for receiving rolls in the window-shaped cutouts.

The circular sheet metal blank can be disk-shaped and possesses a bore that already has the size of the inside diameter of the corresponding side ring. The circular sheet metal blank that is axially clamped in the bore area is formed by press rolls on a suitable tool with axial grooves. This creates radially inward oriented ribs while providing a circumferentially closed tubular form. The tool serves as the base for precise measurements, accuracy of shape and profiling of the ribs, thus making it possible to substantially exactly predetermine, in particular, the angle of the side surfaces of the ribs. Also, because the stamping surface does not come into contact with the roll during subsequent use of the cage no further processing of the cage is required.

According to another aspect of the present invention, a sheet metal cage possesses a conically rolled outer surface and side rings arranged at opposite ends. The cage includes ridges extending between the side rings and window-shaped pockets between adjacent pairs of ridges for receiving tapered rolls. The cage also includes ribs extending inwardly from each of the ridges, with the ribs possessing tapering side surfaces.

In accordance with a further aspect of the present invention, a cage for tapered roll bearings includes a sheet metal cage possessing a conically rolled outer surface and having side rings arranged at opposite ends. Ridges extend between the side rings and window-shaped pockets are formed between adjacent pairs of ridges for receiving tapered rolls. The cage is thicker at locations of the ridges than at other locations of the cage.

BRIEF DESCRIPTION OF THE DRAWING FIGURES

Figure 2:
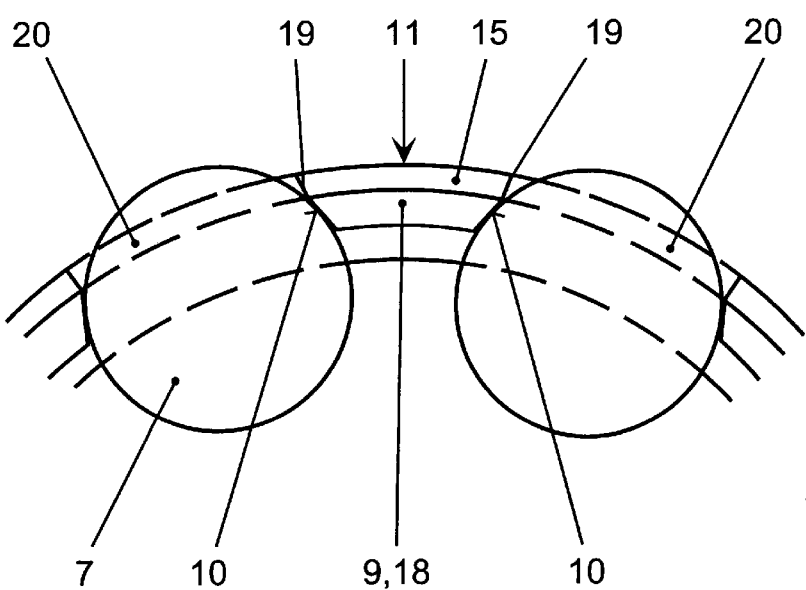

The foregoing and additional features and characteristics associated with the present invention will become more apparent from the following detailed description considered with reference to the accompanying drawing figures in which like elements are designated by like reference numerals and wherein:

FIG. 1 is a partial cross-sectional view of a portion of a roll arbor with press roll and a cage for tapered rolls produced with it; and FIG. 2 is a partial cross-sectional view of the cage shown in FIG. 1 with rolls.

DETAILED DESCRIPTION OF THE INVENTION

The device shown in FIG. 1 is a part of a rolling mill which is illustrated schematically for purposes of clarity and ease in understanding. The rolling mill is used to produce the roller bearing cage shown in FIG. 2. The cage possesses a tapering or conical outer surface, and includes an annular disk-shaped side ring 17 and a side ring 16 at the opposite end of the cage. The annular disk-shaped side ring 17 extends generally radially inwardly at the smaller end of the cage and the side ring 16 extends generally axially at the larger end of the cage.

The cage also includes a plurality of window-shaped pockets 20 for receiving tapered rolls 7. The cage further includes a plurality of circumferentially spaced apart ridges 11. Each of the ridges 11 is defined by a radially inwardly extending rib 18 forming an inner ridge part 9 and a lateral area or outer ridge part 15. The inner ridge part 9 is formed integrally and in one piece with the respective outer ridge part 15 forming each of the ridges 11 of the cage. The ribs 18 or inner ridge parts 9 are provided on the inner surface of the cage and possess tapered or angled guide surfaces 10. The guide surfaces 10 are designed to extend substantially tangentially to the outer surface of the tapered rolls 7.

The rolling mill shown in FIG. 1 for forming the cage shown in FIG. 2 consists of a roll arbor 1, a press arbor 2 and a press roll 3. The roll arbor 1 is provided with a tool 4 that has the conical form of the to-be-produced cage. The outer surface of the tool 4 is provided with profile grooves 6 positioned so as to correspond in location to the ridges 11 in the to-be-produced cage. The top part of the tool 4 is shown as a section along an axis line in the area of the profile groove 6 that, in this case, is located on the top.

The profile groove 6 formed in the tool 4 in this case is approximately as long as the cage roll 7 according to FIG. 2. The side surfaces 8 of the profile grooves 6 are angled in a tapering manner that approximates a V-shape in relation to a radial line, thus resulting in a cross-sectional profile that corresponds to the inner ridge part 9 in the to-be-produced cage as shown in FIG. 2. The angle of the side surfaces 8 is chosen so that the guide surfaces 10 of the inner ridge part 9 or ribs 18 in the cage that are formed by the profile grooves 6 extend tangentially to the outer surface of the tapered roll 7 that is set into the cage at a later time. The quality of the side surfaces of the profile grooves 6, and the position and dimensions of the side surfaces 8 of the profile grooves 6, are very high so that the corresponding guide surfaces 10 of the ridge or ribs in the resulting cage can be used without further processing.

The production of the cage is realized by setting a disk-shaped circular sheet-metal blank 12, which is indicated by a broken line in FIG. 1, onto the centering arbor 13 of the tool 4. The disk-shaped circular sheet-metal blank 12 is fixed with the press arbor 2 in an axially form-fitting manner. The press roll 3 which is shown in part is either guided or controlled along the direction indicated by the illustrated arrow 14. The press roll has the tapered dimensions of the cage.

When the tool 4, the press arbor 2, the circular sheet metal blank 12, and press roll 3 are rotating, the area of the circular sheet metal blank 12 shown with a broken line is first formed into the tapered shape. The material forming the blank 12 is substantially pulled in along the circumference, resulting in an apparent thickening of the material. The excess volume is needed for the inner ridge parts 9 or ribs 18 that are to be formed in the profile grooves 6. The strong radial pressure of the press roll 3 causes material to flow into the profile grooves 6 of the tool 4 so that the profile grooves 6 are completely filled. The diameter of the circular sheet metal blank 12 and the sheet metal thickness are selected so that, with the profile grooves 6 filled, a tapered outer surface 15 remains that still covers the grooves and is closed in the circumferential direction. Also, a large side ring 16 that is arranged axially next to the profile grooves 6 is formed. The small side ring 17 of the cage corresponds to the inside area of the circular sheet metal blank 12 and remains radially oriented.

After this, while the press roll 2 is removed, the cage pre-product is taken from the tool 4. The tubular product consists essentially of the conical outer surface with the ribs 18 or inner ridge parts 9, and the annular disk-shaped side ring 17 at the smaller diameter end. The ribs 18 or inner ridge parts 9 are integrally molded internally on the product and extend essentially axial, but also extend conically. The ridges 11 possess a radial thickness generally twice the thickness of the sheet metal starting material.

In a subsequent working step, a plurality of spaced apart pockets 20 are stamped out from the product using a known stamping device. The stamping device is adjusted or positioned so that the separating line is located exactly between the ridges 11 (or ribs 18) and follows or is generally aligned with the guide surfaces 10. Thus, the material bounded by adjacent pairs of ribs 18 and the side rings 16, 17 is removed. The pockets 20 are window-shaped and are large enough for accepting the tapered rolls 7. The stamping surfaces 19 along the separating line do not require further processing because they are not contacted by the tapered rolls 7. Also, the side areas of the ridges 11 possess a different angle in the lateral area 15 as compared to the ribs 18.

In accordance with the present invention, by using a disk-shaped circular sheet metal blank having provided with a central through hole that is fitted on the centering arbor, the blank already possesses a bore that has the size of the inside diameter of the corresponding side ring. Also, the circular sheet metal blank is axially clamped in the bore area and is formed by press rolls on a suitable tool possessing axial grooves to thereby produce radially inwardly oriented ribs while also providing a closed tubular form. The tool serves as the basis for precise measurements, accuracy of shape and profiling of the ribs. This makes it possible to exactly predetermine, for example, the angle of the side surfaces of the ribs. The pockets are then formed between the ribs in a further working step and these stamping surfaces do not come into contact with the roll during use of the cage, thus avoiding the need to effect further processing on the stamping surfaces.

Because the conical shape of the cage, the arrangement of the ridges 11, including the ribs 18, and their dimensions, surfaces, and separation (i.e., in essence all perceptible dimensions of the cage) are substantially an exact copy of the tool 4, the tool's precision makes it possible to produce a cage that meets or exceeds all requirements. The method can advantageously be performed with little expenditure, and can be performed in a cost-efficient and relatively quick manner.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A cage for tapered roll bearing, comprising:

A sheet metal cage possessing a conical outer surface and having side rings arranged at opposite ends of said cage, the cage including ridges extending between the side rings and window-shaped pockets between adjacent pairs of ridges for receiving tapered rolls, the ridges including ribs forming radially inward portions thereof, said ribs possessing tapering side surfaces, wherein the ridges possess substantially radially extending stamped surfaces located radially outwardly of the tapering side surfaces of the ribs, and wherein the thickness of the ridges is greater than the thickness of at least one of the side rings.

2. The cage according to claim 1, wherein the side ring at one axial end of the cage is a radially inwardly extending side ring.

3. A cage for tapered roll bearings, comprising:

a sheet metal cage possessing a conical outer surface and having side rings arranged at opposite ends of said cage, ridges extending between the side rings, and window-shaped pockets between adjacent pairs of ridges for receiving tapered rolls, the cage being thicker at locations of the ridges than at other locations of the cage, wherein each ridge includes two ridge side surfaces each having a shaped guide section for one of the rolls and substantially radially extending stamped surfaces, the two ridge side surfaces of each ridge being respectively located at adjacent window shaped pockets, each shaped bearing guide section being located radially inwardly of one of the stamped surfaces.

4. The cage according to claim 3, wherein the a radial thickness of the ridges is twice the thickness of the sheet metal.

5. The cage according to claim 3, wherein the a radial thickness of the ridges is twice the thickness of the sheet metal.

6. The cage according to claim 3, wherein the side ring at one axial end of the cage is a radially inwardly extending side ring.

* * * * *

UNITED STATES PATENT AND TRADEMARK OFFICE
CERTIFICATE OF CORRECTION

PATENT NO.    : 6,213,648 B1
DATED         : April 10, 2001
INVENTOR(S)   : Alfred Weidinger It is certified that error appears in the above-identified patent and that said Letters Patent is hereby corrected as shown below:

Title page,
Add the following under:
Item [56] References Cited,

U.S. PATENT DOCUMENTS

| | | | | |
|---|---|---|---|---|
| 1,060,579 | * | 5/1913 | Bayer | 384/571 |
| 1,144,484 | * | 6/1915 | Lockwood | 384/571 |
| 1,166,798 | * | 1/1916 | Whitmer | 384/575 |
| 1,230,145 | * | 6/1917 | Folk | 384/575 |
| 1,282,184 | * | 10/1918 | Buckwalter | 384/575 |
| 1,349,307 | * | 8/1920 | Winn | 384/571 |
| 1,444,326 | * | 2/1923 | Buckwalter | 29/898.067 |
| 1,444,964 | * | 2/1923 | Foster | 384/571 |
| 1,513,999 | * | 11/1924 | Kifer | 384/572 |
| 2,359,120 | * | 9/1944 | Kilayin | 384/580 |
| 2,805,108 | * | 9/1957 | Palmgren | 384/580 |
| 3,940,193 | * | 2/1976 | Molloy | 384/580 |
| 4,522,516 | * | 6/1985 | Neese | 384/572 |

Signed and Sealed this

Twenty-ninth Day of January, 2002

Attest:

Attesting Officer

JAMES E. ROGAN
Director of the United States Patent and Trademark Office